3,558,682
2,3,5 - TRIOXOCYCLOPENTANEHEPTANOIC ACID, DERIVATIVES THEREOF AND INTERMEDIATES THERETO
Raphael Pappo, Skokie, and Christopher J. Jung, Morton Grove, Ill., assignors to G. D. Searle & Co., Chicago, Ill., a corporation of Delaware
No Drawing. Filed June 24, 1968, Ser. No. 739,159
Int. Cl. C07c 61/36, 69/74
U.S. Cl. 260—468           10 Claims

ABSTRACT OF THE DISCLOSURE 2,3,5-trioxocyclopentaneheptanoic acid and derivatives thereof useful by virtue of their pepsin-inhibitory, anti-ulcerogenic, anti-microbial, e.g. anti-bacterial and anti-protozoal, and dicotyledonous seed germination-inhibitory properties.

---

The present invention is concerned with novel polyoxygenated cyclopentaneheptanoic acid derivatives and, more particularly, with 2,3,5-trioxocyclopentaneheptanoic acid and derivatives thereof characterized by the following structural formulas

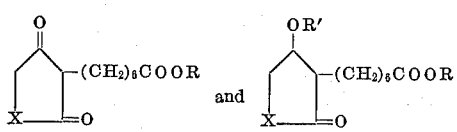

wherein R is selected from the group consisting of hydrogen and a lower alkyl radical, R' is a lower alkyl radical and X is a methylene, hydroxymethylene, carbonyl, or an esterified or etherified hydroxymethylene group wherein the ether or ester function is one readily cleaved by an acidic reagent.

The lower alkyl radicals denoted in the foregoing structural formulas are typified by methyl, ethyl, propyl, butyl, pentyl, hexyl, heptyl and the branched-chain groups isomeric therewith.

The esterified hydroxymethylene groups are typified by alkanoyloxy radicals such as acetyl, propionyl, etc., and aroyloxy radicals such as benzoyloxy. Illustrative of the etherified hydroxymethylene groups are tetrahydropyran-2-yloxy, alkoxyalkyl, triphenylmethoxy and trimethylsilyloxy.

The instant compounds are manufactured by processes which utilize as starting materials 9-oxodecanoic acid or a lower alkyl ester thereof and also di-(lower alkyl) oxalates. As a specific example, 9-oxodecanoic acid is condensed with dimethyl oxalate in the presence of potassium tertiary-butoxide, thus affording 2,3,5,-trioxo-4-methoxyalylcyclopentaneheptanoic acid. Cleavage of the alkoxalyl function of those intermediates is conveniently effected by heating with a mineral acid, for example hydrochloric acid. 2,3,5 - trioxo-4-methoxalylcyclopentaneheptanoic acid together with dilute hydrochloric acid is heated for several hours, thus affording 2,3,5-trioxocyclopentaneheptanoic acid.

Reduction of the instant triketo compounds with a palladium catalyst in neutral medium results in conversion of the 3-keto to a 3-hydroxy group. The aforementioned 2,3,5-trioxocyclopentaneheptanoic acid, for example, is hydrogenated in aqueous isopropyl alcohol in the presence of 5% palladium-on-carbon catalyst to yield 2,5-dioxo-3-hydroxycyclopentaneheptanoic acid. On the other hand, when that reaction is conducted in the presence of a strong acid catalyst such as sulfuric acid, perchloric acid or boron trifluoride, and preferably in the presence of acetic acid also, hydrogenolysis occurs to afford the corresponding 2,5-dioxo substances. 2,3,5-trioxocyclopentaneheptanoic acid is thus shaken with hydrogen at room temperature and a pressure of three atmospheres in the presence of 5% palladium-on-carbon catalyst, acetic acid and sulfuric acid to yield 2,5-dioxocyclopentaneheptanoic acid.

Reaction of the instant polyketo acids with a lower alkanol in the presence of a mineral acid results in concomitant esterification of the carboxyl group and enol formation. The reaction with ethanol, in the presence of sulfuric acid, of 2,5-dioxocyclopentaneheptanoic acid thus affords ethyl 2-ethoxy-5-oxocyclopent-1-eneheptanoate. In the case where the lower alkanol is methanol, esterification is completed by reaction with diazomethane. 2,5-dioxo-3-hydroxycyclopentaneheptanoic acid is thus contacted with methanol and the resulting mixture is allowed to react with diazomethane, thus affording methyl 2-methoxy-4-hydroxy-5-oxocyclopent-1-eneheptanoate.

A preferred procedure for production of the instant enol ethers involves reaction of the aforementioned polyketo acids with a 2,2-di-(lower alkoxy)propane or a lower alkyl orthoformate in the presence of a mineral acid. Typically, 2,5-dioxo-3-hydroxycyclopentaneheptanoic acid is contacted with 2,2-dimethoxypropane and methanolic hydrogen chloride, thus affording methyl 2-methoxy-4-hydroxy-5-oxocyclopentaneheptanoate.

The instant 5-(lower alkoxy)cyclopent-1-eneheptanoic acid derivatives are obtained by careful saponification of the corresponding 5-(lower alkoxy)carboxylic esters. Methyl 2 - methoxy-4-hydroxy-5-oxocyclopent-1-eneheptanoate in methanol is thus allowed to stand with dilute aqueous sodium hydroxide at room temperature for about 24 hours in order to produce the corresponding carboxylic acid i.e., 2-methoxy-4-hydroxy-5-oxocyclopent-1-eneheptanoic acid.

The compounds esterified or etherified at the 3-position are readily prepared from the corresponding 3-hydroxy instant starting materials. Thus, 2-methoxy-4-hydroxy-5-oxocyclopent-1-eneheptanoic acid is contacted with dihydropyran in the presence of p-toluenesulfonic acid to afford 2 - methoxy-3-tetrahydropyran-2'-yloxy-5-oxocyclopent-1-eneheptanoic acid.

The instant compounds possessing a 4-alkoxalyl function are useful as intermediates to the remaining pharmacologically active compounds of this invention. Those pharmacological activities include anti-microbial as exemplified by anti-bacterial, in particular against *Diplococcus pneumoniae*, and anti-protozoal, in particular against *Tetrahymena gelleii*. Those properties are specifically exemplified by the activity of 2,3,5-trioxocyclopentaneheptanoic acid and 2,5-dioxocyclopentaneheptanoic acid when tested in the following assays:

Sterile blood agar is inoculated with a 24-hour broth culture of the bacterium, *Diplococcus pneumoniae*, whereupon approximately 5 mg. of the test compound is placed on the inoculated agar surface. The agar is then incubated at 37° C. for 24 hours, at the end of which time it is observed for zones of inhibition in the area immediately surrounding the test compound.

A sterile nutrient medium of the following composition:

Proteose peptone—12 g.
Sucrose—8 g.
Distilled water—1000 ml.

is inoculated with a viable axenic culture of *Tetrahymena gelleii*, then is incubated at about 25° C. for 24 hours. At the end of that time, 0.5 ml. quantities are transferred aseptically to test tubes containing approximately 5 mg. of the test compound. The test tubes containing the culture alone serve as controls. At the end of a second 24-hour incubation period the tubes are examined microscopically in order to determine the degree of growth of the test organism.

The usefulness of the instant compounds is further illustrated by the pepsin-inhibitory, anti-ulcerogenic and dicotyledonous seed germination-inhibitory activity of 2,3,5-trioxocyclopentaneheptanoic acid.

The anti-ulcerogenic activity of the instant compounds is specifically illustrated by the ability of 2,3,5-trioxocyclopentaneheptanoic acid to inhibit the ulceration reported by Shay et al., Gastroenterology, 5, 43 (1945) to occur in rats subjected to fasting and pyloric ligation. In this test, male Charles River rats weighing 200–250 g. and fasted 72 hours prior to ligation are used. Immediately following ligation, the prescribed dose of compound, dissolved or suspended in 1.0 ml. of pH 2.0 hydrochloric acid is intragastrically administered to each of a group of 6 animals. A like group of animals to which is identically and concurrently administered the acid alone serves as controls. Precisely 19 hours later the stomachs of surviving animals are excised and examined under 5× magnification. The number of ulcers occurring in the non-secretory portion of each stomach is counted and 4 groups according to size, i.e. <2 mm., 2–4 mm., 4–8 mm. and >8 mm. Each rat is then assigned a score, $z$, which is a weighted average of the logarithms of the ulcer counts in the several size groups determined by a formula found approximately optimal by discriminant function analysis to be as follows:

$$z = 20.00 \log (N_1+1) + 0.22 \log (N_2+1) + 46.76 \log (N_3+1) + 6.11 \log (N_4+1)$$

where $N_1 \ldots N_4$ are the observed ulcer counts of the increasing size groups. Since long term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered anti-ulcerogenic. When the aforementioned 2,3,5-trioxocyclopentaneheptanoic acid was assayed at doses of 5 and 10 mg. per kg., an active response was observed.

The instant compounds are, furthermore, useful as intermediates to other pharmacologically active substances. Ethyl 2-methoxy-4-methoxymethoxy-5-oxocyclopent-1-eneheptanoate is thus saponified with sodium hydroxide and the resulting sodium salt is converted by acidification to the free acid, i.e. 2-methoxy-4-methoxymethoxy-5-oxocyclopent-1-eneheptanoic acid. Reaction of that substance with 3-tetrahydropyran-2'-yloxy-1-octynyl magnesium bromide followed by decomposition of the Grignard adduct affords 5-hydroxy-5-(3-tetrahydropyran-2'-yloxy-1-octynyl)-4-methoxymethoxy-2-methoxycyclopent-1-eneheptanoic acid. Cleavage of the ether functions by reaction with acid yields 2-(3-hydroxy-1-octynyl)-3-hydroxy-5-oxocyclopent-1(5)-eneheptanoic acid. The latter substance is a hypotensive agent as is indicated by its ability, when administered intravenously to the rat at doses of 1–4 mcg., to lower blood pressure. It has the ability also to effect smooth muscle contraction as is evidenced by the responses produced upon injection into the guinea pig ileum, the rat uterus or the rabbit duodenum at doses of 5–10 mcg./ml., 1–2 mcg./ml. and 0.65–1.25 mcg./ml., respectively.

The invention will appear more fully from the examples which follow. The examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

To a solution of 11.2 parts of methyl 9-oxodecanoate in 100 parts of tetrahydrofuran is added successively 13.27 parts of dimethyl oxalate and 5.58 parts of 65% sodium hydride in a mineral oil dispersion. Approximately 0.2 part of methanol is then added and the mixture is heated to initiate reaction. Heating at the reflux temperature in a nitrogen atmosphere is continued for about 2 hours. The mixture is then allowed to stand at room temperature for about 16 hours. At the end of that reaction period the mixture is acidified by the addition of approximately 13 parts of sulfuric acid dissolved in 25 parts of water while the temperature is maintained by means of cooling at approximately 20°. The solution is then partitioned between water and chloroform and the organic layer is separated and extracted with dilute aqueous potassium bicarbonate. The alkaline extract is acidified by the addition of hydrochloric acid, then is extracted with chloroform. The chloroform solution is washed with water, dried over anhydrous sodium sulfate and concentrated to dryness. The crude product thus obtained is purified by recrystallization from ether to afford methyl 2,3,5-trioxo-4-methoxalylcyclopentaneheptanoate, melting at about 74–76° and further characterized by the following structural formula

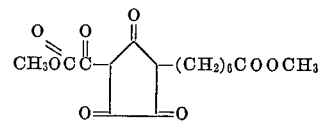

EXAMPLE 2

To a solution of 56.5 parts of potassium metal in 936 parts of tertiary-butyl alcohol is added successively 102 parts of dimethyl oxalate and a solution of 54 parts of 9-oxodecanoic acid in 156 parts of tertiary-butyl alcohol. That addition is carried out over a period of about 40 minutes while the mixture is heated at the reflux temperature in an atmosphere of nitrogen. At the end of the addition period, heating is continued for about 90 minutes longer and the reaction mixture is cooled and filtered under nitrogen. The filter cake is added to a solution of dilute hydrochloric acid and that mixture is extracted with chloroform. The chloroform layer is separated, washed with water, dried over anhydrous sodium sulfate and stripped of solvent under reduced pressure. Recrystallization of the resulting residue from ether affords 2,3,5-trioxo-4-methoxalylcyclopentaneheptanoic acid, melting at about 127–129° and characterized further by the following structural formula

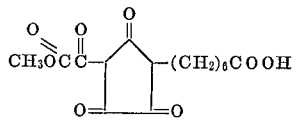

EXAMPLE 3

A mixture containing 50 parts of 2,3,5-trioxo-4-methoxalylcyclopentaneheptanoic acid and 2,880 parts by volume of 2 N hydrochloric acid is slowly distilled in a nitrogen atmosphere for about 2 hours, then is cooled and decolorized with activated carbon. The filtrate thus obtained is concentrated to dryness under reduced pressure and the resulting residue is extracted with ethyl acetate. That organic solution is washed several times with saturated aqueous sodium chloride, then with water and finally dried over anhydrous sodium sulfate and stripped of solvent by distillation under reduced pressure. Recrystallization of the resulting residue from water affords pure 2,3,5-trioxocyclopentaneheptanoic acid, melting at about 102–104°. This compound is represented by the following structural formula

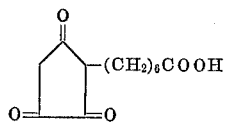

EXAMPLE 4

A mixture containing 45.7 parts of 2,3,5-trioxocyclopentaneheptanoic acid, 13 parts of 5% palladium-on-carbon catalyst, 453 parts of glacial acetic acid and 63.3 parts of concentrated sulfuric acid is shaken with hydrogen at a pressure of 3 atmospheres until 2 molecular equivalents of hydrogen are absorbed. The reaction mixture is then filtered and the resulting filtrate is mixed with 100 parts of solid sodium acetate. Evaporation of that mixture to dryness affords a solid residue which is extracted with water. The resulting extract is filtered and the filter cake is washed with water, dried, then recrystallized from acetone to afford white crystals of 2,5-dioxocyclopentaneheptanoic acid, melting at about 160–161.5°. This compound is represented by the following structural formula

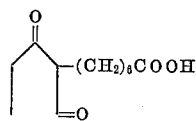

EXAMPLE 5

A mixture containing 26 parts of 2,5-dioxocyclopentaneheptanoic acid, 560 parts of ethanol, 440 parts of benzene and 14.7 parts of concentrated sulfuric acid is slowly distilled over a period of about 40 hours, during which time approximately 200 parts of distillate is collected. The residual mixture is cooled, diluted with approximately 350 parts of ether, then washed successively with dilute aqueous sodium hydroxide and water. The resulting neutral solution is dried over anhydrous sodium sulfate and evaporated to dryness under reduced pressure to afford, as a yellow liquid, ethyl 2-ethoxy-5-oxocyclopent-1-eneheptanoate, which substance is characterized by an ultraviolet absorption maximum at about 253.5 millimicrons.

EXAMPLE 6

A mixture containing 22.16 parts of ethyl 2-ethoxy-5-oxocyclopent-1-eneheptanoate, 785 parts of 0.1 N aqueous sodium hydroxide and 320 parts of ethanol is stored at room temperature for about 48 hours, then is concentrated to approximately ⅔ volume by distillation under reduced pressure. The residual solution is washed with ether, acidified with dilute hydrochloric acid, then extracted with ethyl acetate. The ethyl acetate extracts are washed with water, dried over anhydrous magnesium sulfate and evaporated to dryness by distillation under reduced pressure. The residual solid residue is purified by recrystallization from ether-benzene to afford 2-ethoxy-5-oxocyclopent-1-eneheptanoic acid, melting at about 65–66°. This compuond is represented by the following structural formula

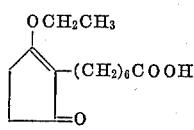

EXAMPLE 7

To a solution of 2 parts of 2,3,5-trioxocyclopentaneheptanoic acid in 50 parts of 70% aqueous isopropyl alcohol is added 0.2 part of 5% palladium-on-carbon catalyst and the resulting reaction mixture is shaken with hydrogen at atmospheric pressure and room temperature until 1 molecular equivalent of hydrogen has been absorbed. The catalyst is removed by filtration and the solvent is distilled under reduced pressure to afford the crude product as a solid residue. Purification by recrystallization from water affords pure 2,5-dioxo-3-hydroxycyclopentaneheptanoic acid, melting at about 127–129.5°. This compound is represented by the following structural formula

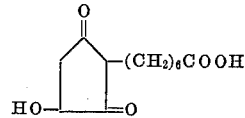

EXAMPLE 8

A solution containing 10 parts of 2,5-dioxo-3-hydroxycyclopentaneheptanoic acid in 1000 parts by volume of 1% methanolic hydrogen chloride is stored at room temperature for about 60 hours, then is concentrated to dryness under reduced pressure. The resulting residue is dissolved in 280 parts of methanol and 10 parts of diazomethane dissolved in ether is added. Concentration of that reaction mixture to dyness affords a residue containing methyl 2-methoxy-3-hydroxy-5-oxocyclopent-1-eneheptanoate and methyl 2-methoxy-4-hydroxy-5-oxocyclopent-1-eneheptanoate. Recrystallization from ether affords the latter compound, represented by the following structural formula

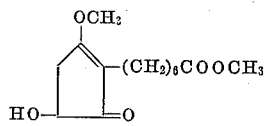

The material obtained from the aforementioned ether filtrate is dissolved in 42 parts of ether and 4 parts of methanol containing 0.08 part of hydrogen chloride is added. The resulting mixture is allowed to stand at room temperature for approximately five days and the crystalline material which separates is additional methyl 2-methoxy-4-hydroxy-5-oxocyclopent-1-eneheptanoate. The filtrate is concentrated to dryness and the residue is recrystallized first from acetone-hexane, then from water to afford methyl 2,5-dioxo-3-hydroxycyclopentaneheptanoate, melting at about 98–99°. This compound is represented by the following structural formula

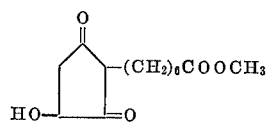

EXAMPLE 9

To a solution of 5 parts of methyl 2-methoxy-4-hydroxy-5-oxocyclopent-1-eneheptanoate in 120 parts of methanol is added 185 parts of 0.1 N aqueous sodium hydroxide and the resulting reaction mixture is kept at room temperature for about 24 hours, then is stripped of organic solvent by distillation under reduced pressure. The residual mixture is extracted with benzene and the aqueous layer is separated, acidified with dilute hydrochloric acid, then extracted with chloroform. The residual aqueous layer is separated, then extracted with ethyl acetate. The ethyl acetate solution thus obtained is dried over anhydrous sodium sulfate, then concentrated to dryness and the resulting residue is purified by recrystallization from acetone to afford 2-methoxy-4-hydroxy-5-oxocyclopent-1-eneheptanoic acid, melting at about 113.5–117°. This compound is represented by the following structural formula

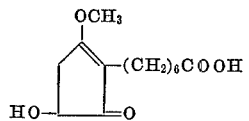

EXAMPLE 10

When equivalent quantities of ethanol and diazoethane are substituted in the procedure of Example 8 there are produced ethyl 5-oxo-3-hydroxy-2-ethoxycyclopent-1-eneheptanoate and ethyl 2,5-dioxo-3-hydroxycyclopentaneheptanoate.

EXAMPLE 11

When equivalent quantities of ethyl 9-oxodecanoic acid and diethyl oxalate are allowed to react according to the procedure described in Example 1, there is produced ethyl 2,3,5-trioxo-4-ethoxalylcyclopentaneheptanoate.

EXAMPLE 12

To a mixture of 1,000 parts by volume of 1% methanolic hydrogen chloride in 50 parts by volume of 2,2-dimethoxypropane is added 10 parts of 2,5-dioxo-3-hydroxycyclopentaneheptanoic acid and the resulting reaction mixture is stored at room temperature for about 20 hours. At the end of that time the mixture is made alkaline by the addition of excess triethylamine, then is partially concentrated by distillation under reduced pressure. Methanol is added to the residue and the mixture is then concentrated almost to dryness. The resulting residual material is diluted with chloroform and that solution is washed with water, dried over anhydrous sodium sulfate and stripped of solvent under reduced pressure. Purification of the resulting residue by recrystallization from ether affords methyl 2-methoxy-4-hydroxy-5-oxocyclopent-1-eneheptanoate, identical with the product of Example 8.

The filtrate from the aforementioned ether recrystallization is concentrated to dryness and the resulting residue containing methyl 2-methoxy-3-hydroxy-5-oxocyclopent-1-eneheptanoate is dissolved in 24.5 parts of ether and 3.5 parts of 2,2-dimethoxypropane followed by 4 parts by volume of methanol containing 0.056 part of hydrogen chloride is added. The resulting reaction mixture is stored at 0–5° for about 72 hours and the crystalline material which separates is collected by filtration and dried to afford additional methyl 2-methoxy-4-hydroxy-5-oxocyclopent-1-eneheptanoate.

EXAMPLE 13

A mixture containing 17.3 parts of 2,5-dioxo-3-hydroxy-cyclopentaneheptanoic acid, 9.79 parts of concentrated sulfuric acid, 372.8 parts of ethanol and 292 parts of benzene is heated at the reflux temperature under nitrogen for about 30 hours, during which time the water of reaction is collected in a water separator. The mixture is then concentrated to approximately 1/10 volume and the residual mixture is diluted with ethyl acetate, then washed with water and diluted further with benzene. That organic solution is extracted twice with dilute aqueous sodium hydroxide and the organic layer is separated, washed with water, dried over anhydrous sodium sulfate and stripped of solvent under reduced pressure. Purification of the resulting residue by recrystallization from ether affords ethyl 2 - ethoxy-4-hydroxy-5-oxocyclopent-1-eneheptanoate, melting at about 79.5–80.5°. This compound is represented by the following structural formula

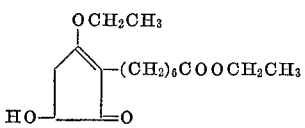

The filtrate from the aforementioned ether recrystallization is concentrated to dryness and the resulting residue is dissolved in 14 parts of ether, following which time 0.8 part of ethanol containing 0.05 part of hydrogen chloride is added. After standing at 0–5° for about 7 days, the crystalline material which separates is collected by filtration and dried to afford an additional quantity of ethyl 2-ethoxy-4-hydroxy-5-oxocyclopent-1-eneheptanoate.

EXAMPLE 14

To a solution of 1 part of ethyl 2-oxo-3-hydroxy-5-ethoxycyclopent-1-eneheptanoate in 21.6 parts of ethanol is added 33.4 parts by volume of 0.1 N aqueous sodium hydroxide and the resulting reaction mixture is allowed to stand at room temperature for about 20 hours. At the end of that reaction period the mixture is concentrated to approximately 1/3 volume and the resulting residue is diluted with water, then extracted with benzene. The aqueous layer is acidified with 33.4 parts by volume of 0.1 N hydrochloric acid, then is extracted with ethyl acetate. The organic extract is washed with water, dried over anhydrous sodium sulfate and stripped of solvent under reduced pressure. The resulting residue is dissolved in ethyl acetate, then extracted with dilute aqueous sodium acetate, washed with water, dried over anhydrous sodium sulfate and stripped of solvent under reduced pressure. Crystallization of the resulting residue from acetone affords 2-ethoxy-4-hydroxy-5-oxocyclopent-1-eneheptanoic acid. This compound is represented by the following structural formula

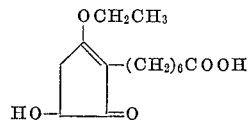

EXAMPLE 15

To a solution of 1 part of ethyl 2-ethoxy-4-hydroxy-5-oxocyclopent-1-eneheptanoate in 37.8 parts of dry benzene is added successively 3.04 parts of N,N-diisopropylethylamine and 0.27 part of chloromethyl methyl ether. The resulting reaction mixture is allowed to stand at room temperature for about 7 hours, at the end of which time an additional 0.27 part of chloromethylmethyl ether is added. After standing at room temperature for an additional 16 hours, a further quantity consisting of 0.27 part of chloromethylmethyl ether is added and the reaction mixture is again allowed to stand at room temperature for about 16 hours. At the conclusion of that reaction period approximately 3 parts of triethylamine is added and the reaction mixture is allowed to stand for about 15 minutes, then is diluted with water. The layers are separated and the organic solution is washed with water, dried over anhydrous sodium sulfate and stripped of solvent under reduced pressure to afford ethyl 2-ethoxy-4-methoxy-methoxy-5-oxocyclopent-1-eneheptanoate. It is represented by the following structural formula

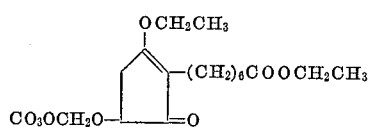

EXAMPLE 16

To a solution of 1 part of ethyl 2-ethoxy-4-methoxymethoxy-5-oxocyclopent-1-eneheptanoate in 44.8 parts of ethanol is added 34 parts by volume of 0.1 N aqueous sodium hydroxide and the resulting reaction mixture is stored at room temperature for about 72 hours. At the end of that time the mixture is partially concentrated and the residue is partitioned between water and benzene-ether. The aqueous layer is separated and acidified with dilute hydrochloric acid and that aqueous acidic mixture is extracted with ethyl acetate. The ethyl acetate layer is separated, washed with water, dried over anhydrous sodium sulfate and stripped of solvent under reduced pressure. The resulting residue is extracted with ether and the ether extract is washed with dilute aqueous sodium acetate and water, then dried over anhydrous sodium sulfate and stripped of solvent under reduced pressure to afford 2-ethoxy-4-methoxymethoxy-5-oxocyclopent-1-eneheptanoic acid.

EXAMPLE 17

Method A

To a mixture containing 6 parts of chloroform, 0.005 part of p-toluenesulfonic acid and 0.5 part of dihydropyan is added 0.5 part of 2-methoxy-4-hydroxy-5-oxocyclopent-1-eneheptanoic acid and the resulting reaction mixture is stored at room temperature for about 16 hours. At the end of that time 0.2 part of triethylamine is added and the mixture is diluted with benzene-ether. The organic solution is extracted with aqueous potassium carbonate and the extracts are combined, acidified with dilute hydrochloric acid, then extracted with ethyl acetate. The ethyl acetate layer is separated, washed with water, dried over anhydrous sodium sulfate and stripped of solvent under reduced pressure to afford 2-methoxy-4-tetrahydropyran-2'-yloxy-5-oxocyclopent-1 - eneheptanoic acid.

Method B

To a mixture containing 0.1 part of dihydropyran, 0.001 part of p-toluenesulfonic acid and 0.7 part of ether is added 0.1 part of 2-methoxy-4-hydroxy-5-oxocyclopent-1-eneheptanoic acid and the resulting reaction mixture is allowed to stand at room temperature for about 16 hours. At the end of that time 0.05 part of the triethylamine is added and the mixture is extracted with benzene-ether. The organic layer is separated, then is extracted with aqueous potassium carbonate. These alkaline extracts are acidified with dilute hydrochloric acid and the acidic mixture is extracted with ethyl acetate. The organic layer is separated, washed with water, dried over anhydrous sodium sulfate and stripped of solvent to afford 2-methoxy-4-tetrahydropyran-2'-yloxy-5-oxocyclopent-1-eneheptanoic acid, identical with the product of Method A.

Method C

To a mixture containing 0.1 part of dihydropyran, 0.001 part of p-toluenesulfonic acid and 0.88 part of benzene is added 0.1 part of 2-methoxy-4-hydroxy-5-oxocyclopent-1-eneheptanoic acid and the resulting reaction mixture is allowed to stand at room temperature for about 16 hours. At the end of that time 0.05 part of triethylamine is added and the reaction mixture is extracted with benzene-ether. The organic layer is separated, then extracted with aqueous potassium carbonate. The alkaline extracts are acidified with dilute hydrochloric acid, then extracted with ethyl acetate. The organic layer is separated, washed with water, dried over anhydrous sodium sulfate and concentrated to dryness under reduced pressure to afford 2-methoxy-4-tetrahydropyran-2'-yloxy-5-oxocyclopent-1-eneheptanoic acid, identical with the product of Method A and Method B.

EXAMPLE 18

To a solution of 0.5 part of 2-methoxy-4-hydroxy-5-oxocyclopent-1-eneheptanoic acid in 7 parts of pyridine is added 1.09 parts of benzoyl chloride and the resulting reaction mixture is allowed to stand at room temperature for about 16 hours. At the end of that time 3 parts of water is added and the mixture is stirred at room temperature for about 4 hours. Additional water and chloroform are then added and the layers are separated. The organic layer is washed successively with dilute cold aqueous potassium carbonate and water, then dried over anhydrous sodium sulfate and stripped of solvent under reduced pressure. The residual material is extracted into benzene and the resulting benzene solution is washed with cold dilute hydrochloric acid. The precipitate which forms is removed by filtration. The filtrate is then washed several times with cold dilute aqueous sodium acetate, then with water. Drying of the resulting solution over anhydrous sodium sulfate followed by removal of the solvent under reduced pressure affords a residue, which is extracted with benzene. That benzene solution is washed successively with dilute aqueous sodium acetate, then dried over anhydrous sodium sulfate and stripped of solvent under reduced pressure to afford 2-methoxy-4-benzoyloxy-5-oxocyclopent-1-eneheptanoic acid.

EXAMPLE 19

To a solution of 2.8 parts of methyl 2-methoxy-4-hydroxy-5-oxocyclopent-1-eneheptanoate in 105.6 parts of dry benzene is added 9.87 parts of N,N-diisopropylethylamine and 0.9 part of chloromethyl methyl ether. The resulting reaction mixture is allowed to stand at room temperature for about 7 hours, at the end of which time an additional 0.9 part of chloromethyl 1 methyl ether is added. That mixture is stored at room temperature for about 16 hours and another 0.9 part portion of chloromethyl methyl ether is added. After the mixture has stood at room temperature for 24 hours longer, 8.8 parts of triethylamine is added and the mixture is stored at room temperature for about 15 minutes, then is diluted with water. The layers are separated and the organic solution is washed with water, dried over anhydrous sodium sulfate and stripped of solvent under reduced pressure to afford methyl 2-methoxy-4-methoxymethoxy-5-oxocyclopent-1-eneheptanoate.

EXAMPLE 20

To a solution of 3.23 parts of methyl 2-methoxy-4-methoxymethoxy - 5 - oxocyclopent - 1 - eneheptanoate in 146.4 parts of methanol is added 104 parts by volume of 0.1 N aqueous sodium hydroxide and that reaction mixture is stored at 0–5° for about 7 days. At the end of that time most of the methanol is removed by distillation under reduced pressure and the resulting residue is diluted with water, then extracted with benzene-ether. The aqueous layer is cooled to 0–5° and acidified by means of cold dilute aqueous hydrochloric acid. The resulting acidic mixture is extracted with cold ethyl acetate and the layers are separated. The organic layer is washed with water, dried over anhydrous sodium sulfate and stripped of solvent under reduced pressure. The residue thus obtained is dissolved in benzene and that organic solution is washed with several portions of dilute aqueous sodium acetate. The organic layer is separated, washed with water, dried over anhydrous sodium sulfate and concentrated to dryness under reduced pressure. The residual material is dissolved in benzene, then is washed successively with dilute aqueous sodium acetate and water, dried over anhydrous sodium sulfate and stripped of solvent under reduced pressure to afford 2-methoxy-4-methoxymethoxy-5-oxocyclopent-1-eneheptanoic acid.

What is claimed is:
1. A member selected from the group consisting of a compound of the formula

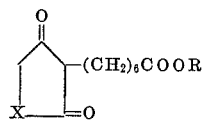

and the corresponding enol ethers represented by the formula

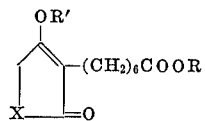

wherein R is selected from the group consisting of hydrogen and a lower alkyl radical, R' is a lower alkyl radical and X is selected from the group consisting of methylene, hydroxymethylene, methoxymethoxymethylene, tetrahydropyran - 2 - yloxymethylene, benzoyloxymethylene and carbonyl radicals.

2. As in claim 1, a compound of the formula

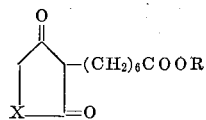

wherein R is selected from the group consisting of hydrogen and a lower alkyl radical and X is selected from the group consisting of methylene, hydroxymethylene and carbonyl radicals.

3. As in claim 1, a compound of the formula

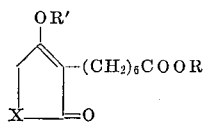

wherein R is selected from the group consisting of hydrogen and a lower alkyl radical, R' is a lower alkyl radical and X is selected from the group consisting of methylene, hydroxymethylene, methoxymethoxymethylene, tetrahydropyran - 2 - yloxymethylene, benzoyloxymethylene and carbonyl radicals.

4. As in claim 1, the compound which is 2,3,5-trioxo-cyclopentaneheptanoic acid.

5. As in claim 1, the compound which is 2,5-dioxo-3-hydroxycyclopentaneheptanoic acid.

6. As in claim 1, the compound which is 2,5-dioxo-cyclopentaneheptanoic acid.

7. As in claim 1, the compound which is 2-methoxy-4-hydroxy-5-oxocyclopent-1-eneheptanoic acid.

8. As in claim 1, the compound which is methyl 2-methoxy-4-hydroxy-5-oxocyclopent-1-eneheptanoate.

9. As in claim 1, the compound which is methyl 2,5-dioxo-3-hydroxycyclopentaneheptanoate.

10. As in claim 1, the compound which is 2-ethoxy-5-oxocyclopent-1-eneheptanoic acid.

References Cited

Katsube et al., Agr. Biol. Chem. 33, 1078, 1969.

LORRAINE A. WEINBERGER, Primary Examiner

R. GERSTL, Assistant Examiner

U.S. Cl. X.R.

71—113; 260—345.7, 345.8, 448.2, 476, 488, 514; 424—317